United States Patent

[11] 3,626,915

| | | |
|---|---|---|
| [72] | Inventor | Yasuo Nakajima<br>Yokosuka, Japan |
| [21] | Appl. No. | 17,142 |
| [22] | Filed | Mar. 6, 1970 |
| [45] | Patented | Dec. 14, 1971 |
| [73] | Assignee | Nissan Motor Company, Limited<br>Yokohama, Japan |
| [32] | Priorities | Mar. 13, 1969 |
| [33] | | Japan |
| [31] | | 44/18565;<br>Sept. 11, 1969, Japan, No. 44/71594 |

[54] VEHICULAR AIR-POLLUTION PREVENTIVE SYSTEM
11 Claims, 15 Drawing Figs.

[52] U.S. Cl. .................................................. 123/124 B,
123/97 B, 123/119 D, 180/105
[51] Int. Cl. ......................................................... F02m 23/04
[50] Field of Search .............................................. 123/124,
124 A, 124 B, 119 D, 97 B, 119 DA; 180/105–108

[56] References Cited
UNITED STATES PATENTS
2,433,205   12/1947   Decker ..................... 123/124 B FOREIGN PATENTS
534,000   2/1941   Great Britain ................   123/124 B

*Primary Examiner*—Wendell E. Burns
*Attorneys*—Robert E. Burns and Emmanuel J. Lobato ABSTRACT: A vehicular air-pollution preventive system for use with an internal combustion engine, which system is adapted to reduce the quantity of nitrogen oxides produced during acceleration or hill climbing in such quantities as to cause a serious air-pollution problem especially when the vehicle is driven in urban areas, having switches closing when the vehicle is driven under predetermined conditions providing the acceleration or hill climbing and a solenoid valve which is adapted to pass atmospheric air to the intake manifold to lean out of the air-fuel mixture in the engine combustion chamber when the switches are closed concurrently. The conditions in which the switches are closed concurrently are represented by variables such as the combination of intake manifold vacuum and engine speed or vehicle speed and of vehicle speed and angular position of the carburetor throttle valve. Atmospheric air to be admixed to the air-fuel mixture may be heated before it is drawn into the engine combustion chamber.

Fig. 5

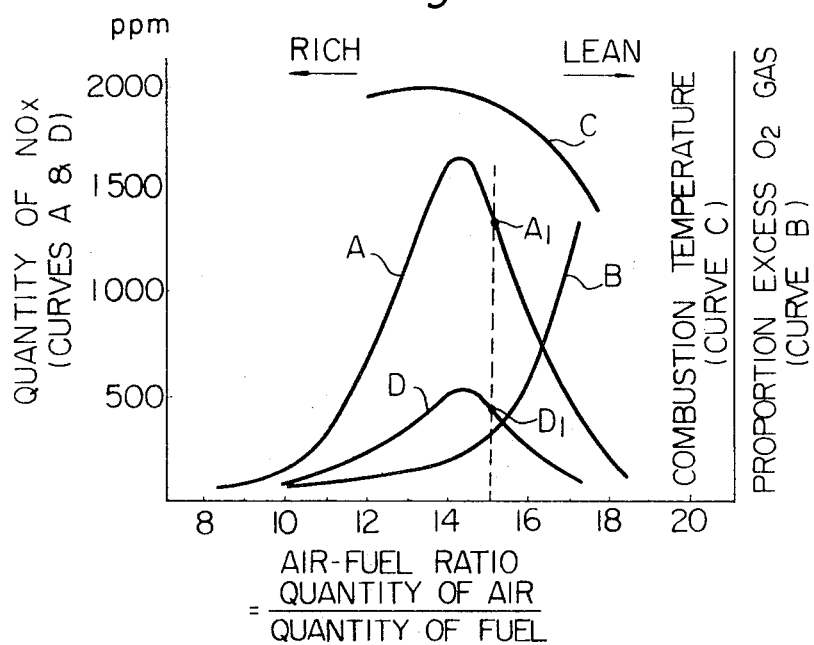
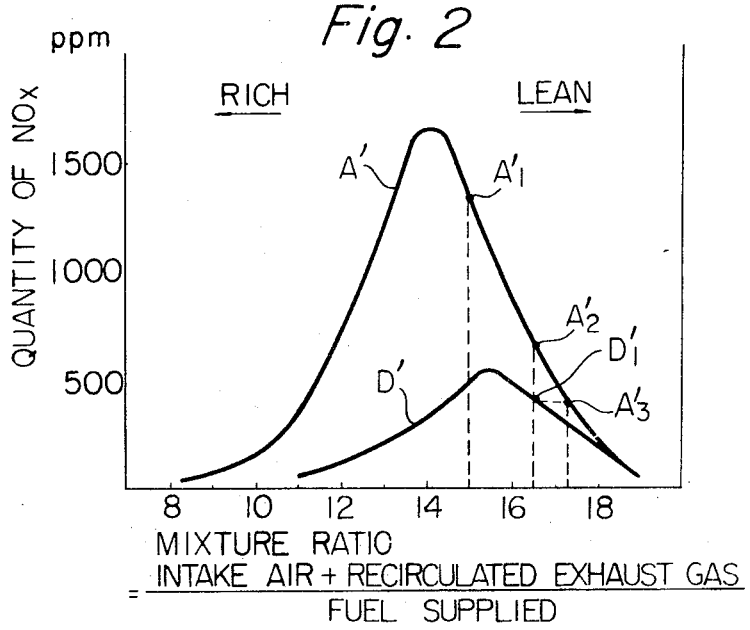

VEHICULAR AIR-POLLUTION PREVENTIVE SYSTEM

This invention relates to a vehicular air-pollution preventive system and, more particularly, to a system adapted to reduce the quantity of toxic nitrogen oxides contained in engine exhaust gases.

Air pollution resulting from the emission of nitrogen oxides is one of serious public nuisances particularly in urban areas of today and it is during acceleration and hill climbing of a motor vehicle that nitrogen oxides are discharged to the open air in such quantities as to cause a serious air-pollution problem in the urban areas. This will mean that the air-pollution problem could be alleviated significantly if the quantity of nitrogen oxides is reduced during acceleration and hill climbing that occur frequently when the motor vehicle is driven in urban areas.

It is well known that the quantity of nitrogen oxides contained as toxic compounds in the exhaust gases from an internal combustion engine varies markedly with the air-fuel ratio of the air-fuel mixture supplied to the engine and peaks up at a certain air-fuel ratio if the motor vehicle is driven at a fixed speed. This is because of the fact that the quantity of nitrogen oxides produced is related to the amount of excess oxygen contained in the air-fuel mixture as well as to a flame temperature at which the mixture is combusted in the engine. As the air-fuel mixture becomes leaner, namely, the air-fuel ratio of the mixture becomes greater, the amount of excess oxygen in the mixture decreases and the flame temperature becomes lower, as ascertained by various experimental investigations.

In order to reduce the quantity of nitrogen oxides in the engine exhaust gases not merely in the driving in urban areas, various attempts have been made including a scheme of recirculating the engine exhaust gases to the intake manifold of the engine. In this known practice, the engine exhaust gases are partially recirculated to the intake manifold where a regulated amount of inert gases are added to the recirculated exhaust gases to lower the temperature at which the exhaust gases are burned for a second time. This reduction in the flame temperature prevents reaction that would otherwise take place between nitrogen and oxygen in the exhaust gases. Thus, the quantity of nitrogen oxides contained in the finally discharged exhaust gases can be reduced significantly without detriment to the performance quality of the engine.

In spite of the prominent reduction in the quality of nitrogen oxides in the exhaust gases, recirculation of the exhaust gases to the intake manifold still encounters a problem in that the engine components are subject to contamination with lead, carbon and moisture contents of the recirculated exhaust gases so as to eventually shorten the life of the engine.

It is therefore an object of the invention to provide an air-pollution preventive system which is capable of reducing the quantity of nitrogen oxides in the engine exhaust gases without recirculating the exhaust gases to the engine.

It is another object of the invention to provide an air-pollution preventive system which is adapted to reduce the quantity of nitrogen oxides when the engine is driven under predetermined conditions to provide acceleration or hill climbing of the motor vehicle.

According to one feature of the invention to achieve these objects, the air-pollution preventive system is constructed in a manner that a regulated amount of additional air is drawn to the engine via an independent passage to lean out the air-fuel mixture supplied thereto when the engine is driven under the predetermined conditions to effect the acceleration or hill climbing. Such predetermined driving conditions of the engine may be represented by numerous variables such as for example the combination of engine speed and intake manifold vacuum or of vehicle speed and intake manifold vacuum or angular position of the throttle valve of the carburetor.

According to another feature of the invention, the additional air is drawn to the engine via a heat exchanger with means to detect the temperature of the air to be passed through the heat exchanger, whereby the air-fuel mixture which is leaned out with the supply of additional air is satisfactorily atomized and propagated throughout the combustion chamber to contribute to improvement of the operation stability of the engine.

In the drawings:

FIG. 1 is a graphical representation exemplifying the variations, in terms of air-fuel ratio of the air-fuel mixture, of the quantity of nitrogen oxides ($NO_x$) produced unless any air-pollution preventive device is used (curve A), amount of excess oxygen in the air-fuel mixture (curve B), flame temperature at which the air-fuel mixture is combusted (curve C), and quantity of nitrogen oxides produced when the exhaust gases are partially recirculated as in the conventional practice (curve D);

FIG. 2 is similar to FIG. 1 but shows curves which corresponds to the curves A and D of FIG. 1 but which are plotted in terms of mixture ratio of the total of the quantities of intake air and recirculated exhaust gases to the quantity of supplied fuel;

Figure 3:
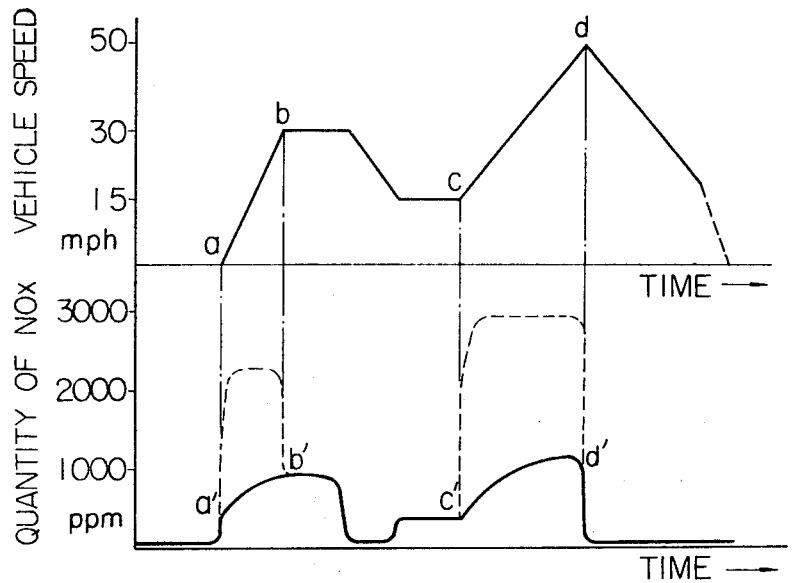
FIG. 3 is a graphical representation of a typical example of the relationships between the vehicle speed of a motor vehicle running on city roads and the quantity of nitrogen oxides in the then emitted exhaust gases.

When, now, the air-fuel ratio (a ratio of the quantity of air to the quantity of fuel mixed with the air) of an air-fuel mixture to be supplied to the engine operating at a fixed speed, say, about 50 km./hr. is increased continuously, then the quantity of nitrogen oxides increases abruptly and peaks up when the air-fuel ratio reaches a certain value which is, for example, about 14 to 15 as indicated by the curve A in FIG. 1. As the air-fuel ratio is further increased in excess of this particular value, the quantity of nitrogen oxides decreases.

This phenomenon is accounted for by the fact that the quantity of nitrogen oxides emitted from an internal combustion engine is related to the amount of excess oxygen contained in the air-fuel mixture as well as to a flame temperature at which the mixture is burned in the engine combustion chamber. As the air-fuel mixture is enriched, namely, the air-fuel ratio of the mixture is reduced, then the amount of excess oxygen decreases as shown by the curve B in FIG. 1. As the air-fuel mixture is leaned out and the air-fuel ratio increased, the flame temperature contributing much to the production of nitrogen oxides decreases as indicated by the curve C.

The quantity of nitrogen oxides produced when the engine is driven at a fixed, relatively high speed can be reduced remarkably by adopting the conventional exhaust recirculation practice, as will be readily understood by comparing the curve A with the curve D in FIG. 1. If, for instance, 10 percent of the exhaust gases is recirculated to the intake manifold, then the quantity $A_1$ of nitrogen oxides to be emitted when the air-fuel ratio is 15 will be reduced about 70 percent to a level represented by $D_1$ on the curve D.

Notwithstanding such pronounced reduction in the quantity of nitrogen oxides, the scheme of recirculating the engine exhaust gases is not accepted as entirely satisfactory because of the contamination of the engine components, as previously discussed.

The air-pollution preventive system proposed by this invention is, therefore, specifically adapted to inhibit the production of nitrogen oxides without recirculating the exhaust gases to the engine intake manifold.

To understand the outstanding features of the air-pollution preventive system according to the invention, discussion may well be given in connection with the conventional exhaust recirculation practice.

If, now, the quantity of nitrogen oxides in the engine exhaust gases is plotted in terms of a mixture ratio of the total of the quantities of air and fuel to the quantity of the fuel in lieu of the usual air-fuel ratio, then curves shown in FIG. 2 are obtained, wherein the curve A' and D' correspond with the curve A and D, respectively, of FIG. 1. As observed from FIG. 2, the quantity $D'_1$ (which corresponds to $D_1$ in FIG. 1) of nitrogen oxides produced when the exhaust gases are recirculated occurs at a mixture ratio which is about 1.5 higher than the mixture ratio at which nitrogen oxides are produced in a quantity $A'_1$ (which corresponds to $A_1$ in FIG. 1). This will mean that, when the engine is supplied with an air-fuel mixture of a certain mixture ratio providing the quantity $D'_1$ of nitrogen oxides with the exhaust gases recirculated, then the engine must be driven under those conditions which are substantially similar or even slightly inferior to the conditions in which the engine is driven with an air-fuel mixture of the same mixture ratio with the exhaust gases not recirculated and in which the nitrogen oxides are produced in a quantity $A'_2$. In other words, the difference between the quantities $A'_2$ and $D'_1$ is not significant notwithstanding the fact that the quantity $D'_1$ is smaller than the quantity $A'_2$. Thus, the quantity of nitrogen oxides will be reduced to a certain extent without recirculating the exhaust gases if fresh air is admixed to the air-fuel mixture in such a manner that the mixture is rendered leaner with the mixture ratio increased. If, as a matter of fact, the mixture ratio is increased from 15 to 16.5, for instance, then the quantity of nitrogen oxides will be reduced for $A'_1$ to $A'_2$. Where, in this instance, it is positively desired to have the quantity of nitrogen oxides reduced to the level of $D'_1$, the additional air should be supplied to the air-fuel mixture in such a quantity that the mixture is leaned out to a mixture ratio providing the quantity $A'_3(=D'_1)$ of the nitrogen oxides. It may be mentioned that, although the production of nitrogen oxides can also be suppressed by enriching the air-fuel mixture (to a mixture ratio of 11 or 12 for instance) as seen in FIG. 2, the quantity of hydrocarbons contained in the exhaust gases is increased thereby and, for this reason, such enrichment of the mixture is not acceptable from the view point of air contamination.

The quantity of nitrogen oxides contained in the engine exhaust gases, when examined from another point of view, is intimately related to the vehicle speed. The investigations conducted by the inventor have revealed that it is during acceleration and hill climbing that the quantity of nitrogen oxides increases to such an extent as to cause a serious air-pollution problem in urban areas. This will be ascertained by reference to FIG. 3, which shows that as the vehicle speed is increased from a to b for acceleration or c to d for hill climbing, the quantity of nitrogen oxides increases abruptly as indicated by the broken curve a'–b' or c'–d', respectively. Thus, the emission of nitrogen oxides could be reduced effectively throughout the varying modes of vehicular operations if the emission is minimized during acceleration and hill climbing.

In order to realize such scheme, the invention proposes, as preferable to have the ranges a–b and c–d of the driving conditions of the vehicle represented by the combination of intake manifold vacuum and engine speed, intake manifold vacuum and vehicle speed, or vehicle speed and angular position of the carburetor throttle valve (or effective throttle area).

Figures 4, 5:
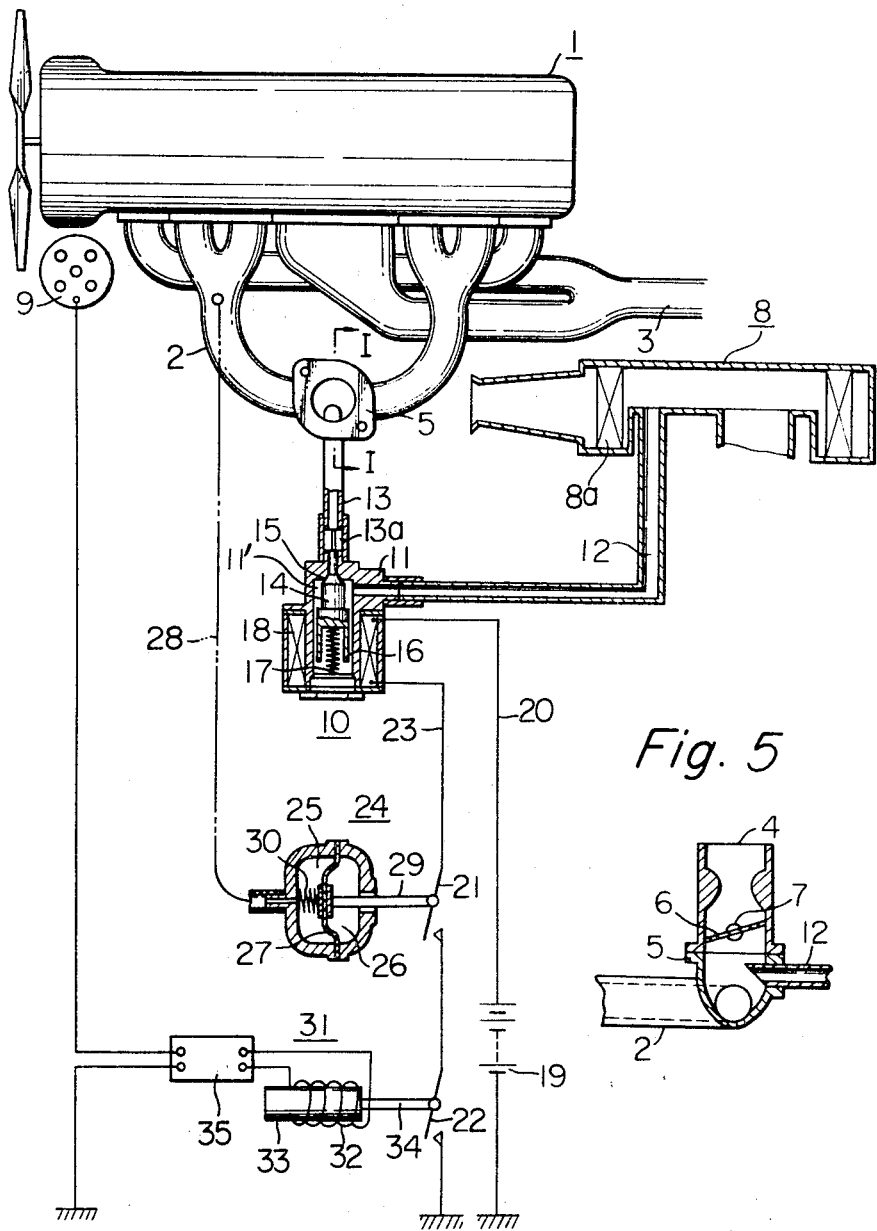
FIG. 4 is a sectional view showing a preferred embodiment of the air-pollution preventive system according to the invention as combined with a usual automotive internal combustion engine which is shown in a schematical and view.
FIG. 5 is a section on line I—I of FIG. 4.

A preferred embodiment to accomplish such an end is shown in FIGS. 4 and 5.

As best seen in FIG. 4, the system according to the invention is used in combination with a usual automotive internal combustion engine which is generally designated by reference numeral 1. The engine 1 has, as customary, an intake manifold 2 and exhaust manifold 3 and is combined with a carburetor 4 which is removed from FIG. 4 for simplicity of illustration. The carburetor 4 is anyway mounted on the intake manifold 2 by a mounting flange 5 and, as illustrated in FIG. 5, has a throttle valve 6 which is mounted on and rotatable with a rotary shaft, as customary.

The air-pollution preventive system implementing the invention essentially comprises a solenoid valve 10 to control the flow of fresh air to the intake manifold 2. The solenoid valve 10 has a casing 11 having formed therein a chamber 11' to provide air communication between the intake manifold 2 and the atmosphere through passages 12 and 13. The passage 12 to introduce air into the chamber 11' is herein shown as vented from the atmosphere through an engine air cleaner 8 with cleaner element 8a but, if preferred, the same may be debouched direct into the open air. The passage 13 connecting the chamber 11' with the intake manifold 2 is herein shown as opened into the intake manifold immediately downstream of the carburetor 4. An orifice 13a may be provided in the passage 13 so as to control the flow of air therethrough.

A valve element 14 is operatively mounted in the casing 11 and is positioned relative to a valve seat 15 forming part of the inner wall of the chamber 11'. The valve element 14 is integrally combined with a hollow cylinder 16 which is axially movably mounted in the casing 11. The hollow cylinder 16 has accommodated therein a compression spring 17 so that the hollow cylinder 16 is forced in a direction in which the valve element 14 is seated on the valve seat 15 to block the communication between the passages 12 and 13. The hollow cylinder 16 also serves as a solenoid core which is actuated into motion by a solenoid coil 18 and is powered by a suitable source 19 of electric energy through a line 20.

The solenoid valve 10 thus constructed is operated by control means which is responsive to the driving conditions of the motor vehicle so that the valve element 14 is moved to and seated on the valve seat 15 when predetermined driving conditions are responded to by the control means.

The driving conditions of the vehicle may be represented by numerous variables as already discussed and, in the particular embodiment of FIGS. 4 and 5, the control means is arranged to be responsive to the vacuum in the intake manifold of the engine and to the revolution speed of the engine.

The control means may be, as illustrated in FIG. 4, comprised essentially of a vacuum switch 21 and engine speed switch 22, which are connected in series with the solenoid coil 18 of the solenoid valve 10 through a line 23. The vacuum switch 21 is controlled by a diaphragm device 24 which detects the variation in the vacuum in the intake manifold 2. The diaphragm device 24 has a vacuum chamber 25 and atmospheric chamber 27 which is separated from the former by a diaphragm member 27. The vacuum chamber 25 communicates with the intake manifold 2 of the engine 1 through a vacuum conduit 28. The atmospheric chamber 26, on the other hand, is vented to the atmosphere and maintained at an atmospheric pressure at all times. The diaphragm member 27 is connected with the vacuum switch 21 by a connecting rod 29 extending through the atmospheric chamber 26. In the vacuum chamber 25 is mounted a compression spring 30 whereby the diaphragm member 27 is forced toward the atmospheric chamber 26, namely, in a direction in which the vacuum switch 21 connected with the diaphragm member 27 is closed. The compression of the spring 30 is determined in a manner to overpower the intake manifold vacuums lower than a predetermined level at which the motor vehicle starts acceleration or hill climbing, say, about −350 mm. of Hg.

The engine speed switch 22, on the other hand, is controlled by a solenoid device 31 having a solenoid coil 32 and moving core 33. The moving core 33 is connected with the switch 22 through a connecting rod 34 and is positioned to normally keep the switch 22 to open and to be moved to a position to close the switch when the solenoid coil 32 is excited. The solenoid coil 32 is connected to and excited by the output terminal of a pulse counter 35 of known construction. The input terminal of the pulse counter 35, in turn, is connected to an ignition distributor 9 of the engine. The pulse counter 35 thus detects the number of pulses fed from the primary winding of the ignition coil (not identified) of the ignition distributor 9. The pulse counter 33 may be of such a type as to excite the solenoid coil 32 when it detects pulses in a number proportional to an engine speed within a predetermined range. The switch 22 is thus closed only when the engine is driven at a speed falling within a predetermined range, for instance, from 1,500 to 3,200 r.p.m.

When, in operation, the engine is driven under conditions in which the quantity of nitrogen oxides contained in the engine exhaust gases is not such that will cause a serious air-pollution problem as during deceleration or normal cruising, then the engine speed and/or intake manifold vacuum will be outside the range within which the vacuum switch 21 and/or engine speed switch 22 are to be closed. In this particular condition, the solenoid coil 18 of the solenoid valve 10 is kept disconnected from the source 19 of power and thus remains unexcited. As the consequence, the valve element 14 remains seated on the valve seat 15 by the action of the compression spring 17, isolating the intake manifold 2 from the atmosphere. Atmospheric air passed into the passage 12 is in this manner prohibited from entering the passage 13 through the chamber 11' when the intake manifold vacuum is higher than a predetermined level of, for instance, −350 mm. of Hg and when the engine speed is limited within a predetermined range of, for instance, 1,500 to 3,200 r.p.m.

When, on the other hand, the engine power output is increased to such an extent as to produce nitrogen oxides in quantities to cause a serious air-pollution problem as represented by the broken curve $a'-b'$ or $c'-d'$ in FIG. 3, then the intake manifold vacuum drops abruptly under the aforementioned predetermined level of −350mm. of Hg for instance and concurrently the engine speed increases to a level falling within the aforementioned predetermined range of 1,500 to 3,200 r.p.m. for instance. In this condition, the spring 30 overpowers the intake manifold vacuum exercised on the diaphragm member 27 of the diaphragm device so that the diaphragm member 27 is moved to a position in which the switch 21 is closed. At the same time, the number of pulses supplied from the ignition distributor 8 now falls within the range corresponding to the predetermined range of engine speed. The solenoid coil 32 is consequently excited and the moving core 33 protruded to close the switch 22. The two switches 21 and 22 thus being closed concurrently, the solenoid coil 18 of the solenoid valve 10 now becomes energized to cause the valve element 14 to be unseated from the valve seat 15 against the action of the spring 17, thereby permitting the air in the passage 12 to flow into the passage 13 and further to the intake manifold 2 of the engine. As a result, the mixture ratio of the air-fuel mixture to be drawn into the engine combustion chamber (not identified) is reduced and the quantity of nitrogen oxides in the exhaust gases is decreased from the level indicated by the broken curve $a'-b'$ or $c'-d'$ down to the level indicated by the solid curve $a'-b'$ or $c'-d'$ as shown in FIG. 3.

Figure 6:
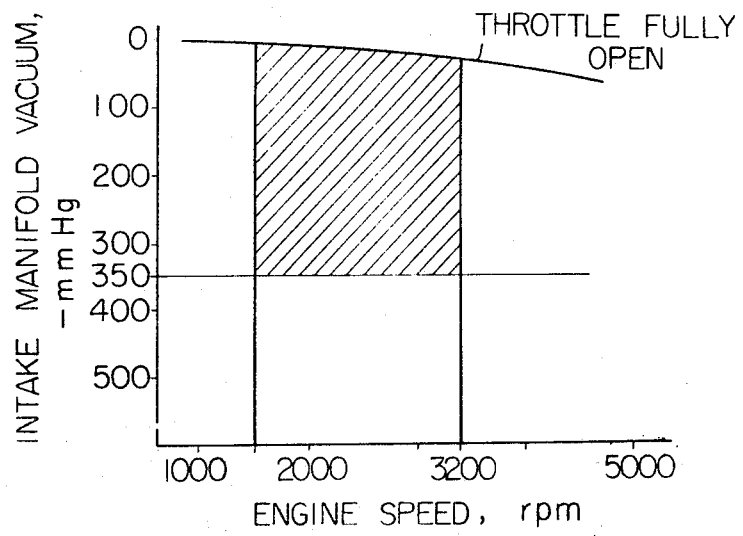
FIG. 6 is a graphical representation exemplifying a region in which the system shown in FIGS. 4 and 5 is operable.

The range in which the air-fuel mixture is to be leaned out is shown by the hatched area in FIG. 6, in which it is assumed by way of example that additional air is supplied to the air-fuel mixture only when the engine is driven at speeds in the range of 1,500 to 3,200 r.p.m. and when the intake manifold vacuum is lower that −350mm. of Hg.

Figure 7:
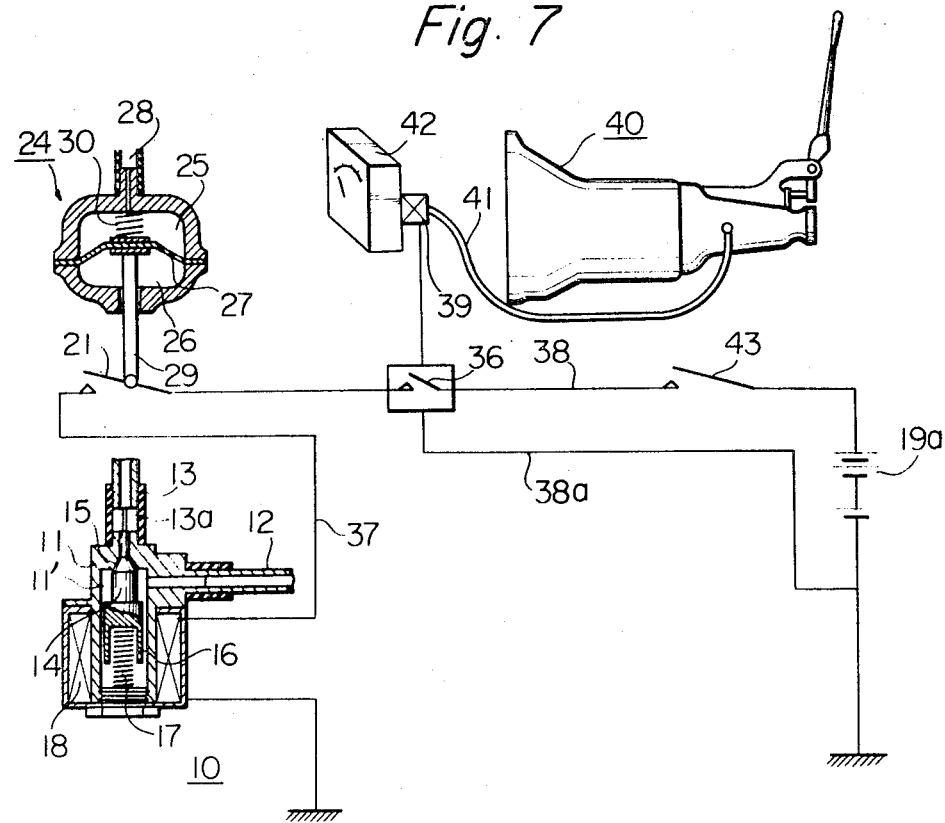
FIG. 7 is similar to FIG. 4 but shows a modification of the system shown therein.

Another form of the air-pollution preventive system realizing the basic concept of the invention is illustrated in FIG. 7. This modified embodiment uses a solenoid valve which is totally similarly constructed to the counterpart shown in FIG. 4 and, as such, like reference numerals are assigned to corresponding parts. The solenoid valve 10 in this modified embodiment, however, is operated by control means responsive to the intake manifold vacuum and vehicle speed. The intake manifold vacuum is responded to by a diaphragm device which is constructed similarly to the device 24 in FIG. 4. The corresponding parts of the diaphragm devices are therefore designated entirely likewise. The vehicle speed, on the other hand, is derived as a speed selected in the transmission system of the vehicle.

As illustrated in FIG. 7, the control means is essentially comprised of a vacuum switch 21 controlled by the diaphragm device 24 and a vehicle speed switch 36. The switches 21 and 36 are connected in series with the solenoid coil 18 of the solenoid valve 10 through a line 37 and with a power source 19a through a line 38. The vehicle speed switch 36 is operated by a vehicle speed detector 39 which is driven by the output shaft (not identified) of the transmission system 40 through a driving shaft 41 so as to detect the revolution speed of the output shaft of the transmission system. The vehicle speed detector 39 delivers voltages proportional to the speeds detected thereby and energizes the switch 36. The switch 36 may be constructed as a normally-open relay switch which is arranged to close when it is energized with a voltage corresponding to a vehicle speed ranging from 20 to 80 km./hr., by way of example.

The vehicle speed detector 39 is herein shown as connected with a speed meter 42 which visibly indicates the vehicle speed selected in the transmission system from time to time. Denoted by 43 is an ignition switch which may be interposed, if desired, between the vehicle speed switch 36 and power source 19a.

When, in operation, the intake manifold vacuum is lower than a predetermined level such as for example about −350 mm. of Hg, then the switch 21 will be kept open. Similarly, when the vehicle speed detected by the vehicle speed detector 39 is higher or lower than a predetermined range of 20 to 80 km./hr., then, the relay switch 36 is kept open. With at least one of the switches 21, 36 and 43 kept open, the solenoid coil 18 of the solenoid valve 10 is disconnected from the power source 19a so that the valve element 14 remains seated to block the air communication between the intake manifold 2 and the atmosphere.

If, however, the engine output is increased for acceleration or hill climbing so as to produce nitrogen oxides in a quantity to cause a serious air-pollution problem as indicated by the broken curve $a'-b'$ or $c'-d'$ in FIG. 3, then the intake manifold vacuum drops and the vehicle speed rises abruptly. Once the intake manifold vacuum becomes lower than a predetermined level of, for instance, −350 mm. of Hg and the vehicle speed falls within a predetermined range of, for instance, 20 to 80 km./hr., then the switches 21 and 36 and the switch 43, if any, are closed, energizing the solenoid coil 18 of the solenoid valve 10. The valve element 14 is as the consequence retracted and unseated from the valve seat 15 against the action of the spring 17, thus providing the air communication between the passages 12 and 13. Air delivered from the atmosphere through the passage 12 is in this manner introduced into the intake manifold 2 of the engine, leaning out the air-fuel mixture to be drawn to the combustion chamber (not shown).

Figure 8:
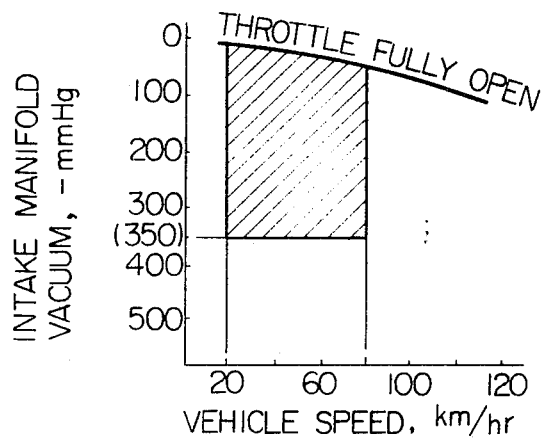
FIG. 8 is similar to FIG. 6 but shows a region in which the modified system of FIG. 7 is operable.

The range within which the additional air is admixed to the air-fuel mixture to lean it out is illustrated in FIG. 8, in which the switch 21 is assumed to close when the intake manifold vacuum is lower than −350 mm. of Hg and the switch 36 assumed to close when the vehicle is driven at a speed ranging between 20 and 80 km./hr., by way of example.

Figure 9:
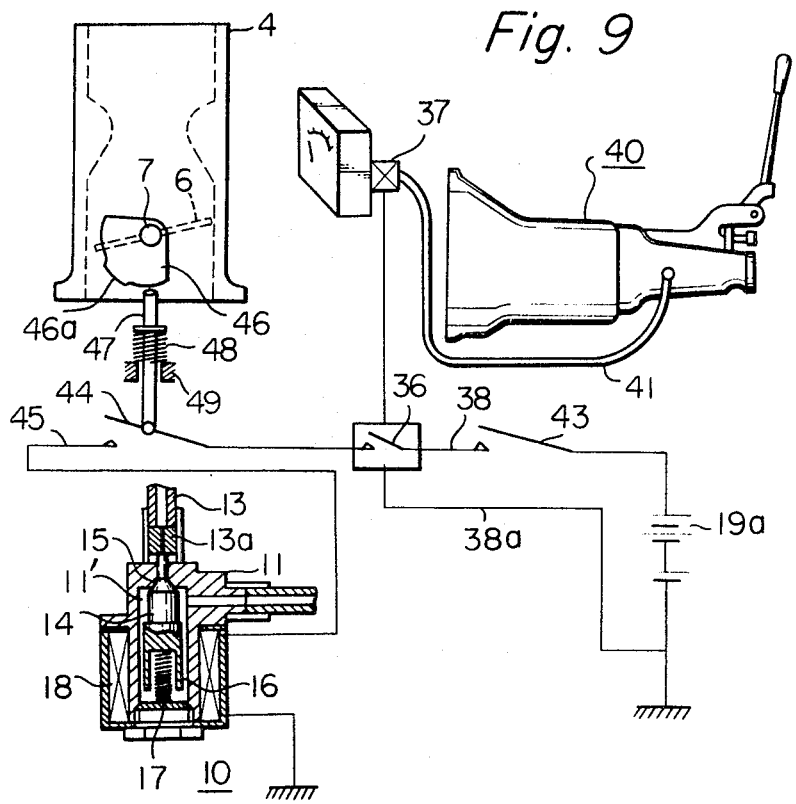
FIG. 9 is also similar to FIG. 4 but shows another modification.

FIG. 9 illustrates another modification of the air-preventive system of this invention, the modification being arranged to be operable on the angular position of the throttle valve in the carburetor and the vehicle speed.

The modified system illustrated herein also uses a solenoid valve which is similar to those used in the embodiments previously described and shown. The same reference numerals are, therefore, employed in FIG. 9 to designate corresponding parts.

The solenoid valve 10 in this modification is operated by control means essentially comprising a throttle valve switch 44 and a vehicle speed switch which is designated by 36 because it is arranged entirely similarly to the switch 36 shown in FIG. 7. The switches 44 and 36 are connected in series with the solenoid coil 18 of the solenoid valve 10 through a line 45 and with a power source 19a through a line 38.

The throttle valve switch 44 is operated by means of a cam arrangement which detects the angular position of the throttle valve of the carburetor, namely, the effective throttle area in the carburetor, which angular position or effective throttle area varies with the driving conditions of the motor vehicle.

Referring to FIG. 9, the cam arrangement is essentially comprised of a cam element 46 having a partially protruded peripheral edge 46a. The cam element 46 is securely mounted on and rotated with the shaft 7 supporting the throttle valve 6. An actuating rod 47 is rigidly connected at one end with the throttle valve switch 44 and positioned at the other relative to the cam element 46. The rod 47 is normally forced toward the cam element 46 by the action of a compression spring 48 which is mounted on a fixed support 49. When the cam element 46 rotates with the rotation of the throttle valve shaft 7, the protruded peripheral edge 46a abuts against the leading end of the actuating rod 47, which is consequently retracted from the initial position against the action of the compression spring 48, causing the switch 44 to close. The relative position of the protruded peripheral edge 46a and/or actuating rod 47 may be determined in such a manner that the switch 44 is closed when the motor vehicle is driven under conditions corresponding to the lines a–b and c–d in FIG. 3 and preferably when the throttle valve 46 is open at 15 to 45 degrees.

Thus, when the motor vehicle is driven at a speed falling within a predetermined range of, for instance, 20 to 80 km./hr. and with the carburetor throttle valve open at an angle falling within a predetermined range of, for instance, 15 to 45 degrees, then the switches 44 and 36 are closed to cause the solenoid coil 18 of the solenoid valve 10 to be energized. The valve element 14 is consequently unseated and atmospheric air passed through the chamber 11' into the intake manifold 2, making the air-fuel mixture in the engine leaner to a desired mixture ratio.

Figure 10:
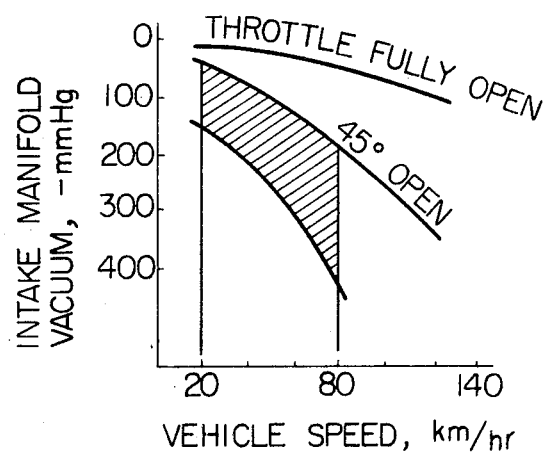
FIG. 10 is also similar to FIG. 6 but shows a region in which the system illustrated in FIG. 9 is operable.

FIG. 10 illustrates an example of the range in which the two switches 36 and 45 are closed concurrently in the air-preventive system of FIG. 9.

Introduction of additional air into the engine combustion chamber is, as previously discussed, conductive to the reduction of nitrogen oxides contained in the engine exhaust gases especially during acceleration and hill climbing but it is nonetheless true that such introduction of air, which is usually rather cool, sometimes invites unstable combustion performance of the engine and reduction in the power output of the engine during those vehicle operations in which emission of nitrogen oxides does not cause a serious public nuisance.

Figure 11:
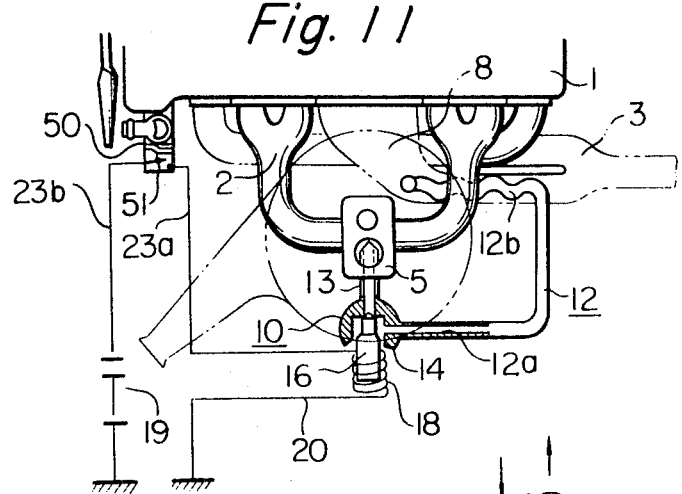
FIG. 11 is a schematic view similar to FIG. 4 but shows a further modified form of the system shown therein.

Thus, it is preferable in carrying out this invention to have atmospheric air heated before it is passed over to the intake manifold of the engine by means of an economically feasible expedient which forms part of the feature of the invention, an example being illustrated in FIG. 11.

Referring to FIG. 11, the passage 12 is shown to lead to the chamber 11' of the solenoid valve 10 through an orifice 12a and to communicate with the atmosphere en route a meandering portion 12b which passes through the exhaust manifold 3. The meandering portion 12b of the passage 12 thus acts as a heat exchanger which exchange heat of the exhaust gases is transferred to atmospheric air being passed therethrough so that the atmospheric air is cooled off before it is drawn to the chamber 11'.

In order to prevent the solenoid valve 10 to become operative to pass additional air into the engine before the engine is warmed up, suitable means may be provided which operates to disconnect the solenoid valve from the power source unless the engine is run hot. Such means may preferably be operated by a thermostat device 50 which is usually mounted on the engine of water-cooled type.

As shown in FIG. 11, the thermostat device 50 is provided with a thermal switch 51 which is dipped in the cooling water of the engine cooling system (not identified) and which is interposed between the solenoid coil 18 of the solenoid valve 10 and any of the aforementioned switches 21, 22, 36 and 44 as the case may be. The thermal switch 51 is responsive to the temperature at which the engine is driven and operated in a manner to close when the temperature reaches a predetermined level, namely, the engine is warmed up. It will be understood that, when the engine is run cold, the quantity of nitrogen oxides produced is practically negligible from the view point of air-pollution so that interruption of supply of additional atmospheric air to the air-fuel mixture does not arise any problem.

Figure 12A:
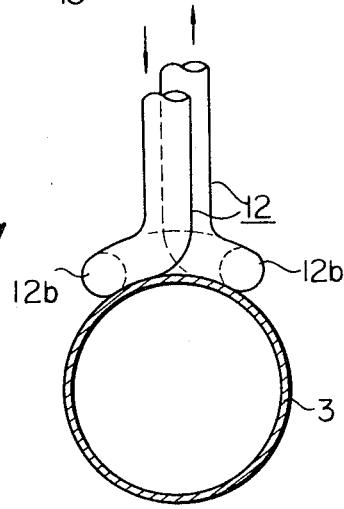
FIGS. 12a and 12b are schematic views showing examples of means to heat the additional air to be admixed to the air-fuel mixtures in the engine.

Exchange of heat between atmospheric air and exhaust gases may be effected in numerous manners. For instance, the atmospheric air may be heated through utilization of enthalpy of the hot exhaust gases. An example is shown in FIG. 12a, in which the portion 12b of the passage 12 is held in contact with the outer peripheral surface of the exhaust manifold 2 so that air in the passage 12 is warmed as it absorbs the enthalpy of the hot exhaust gases in the exhaust manifold 3.

Figure 12B:
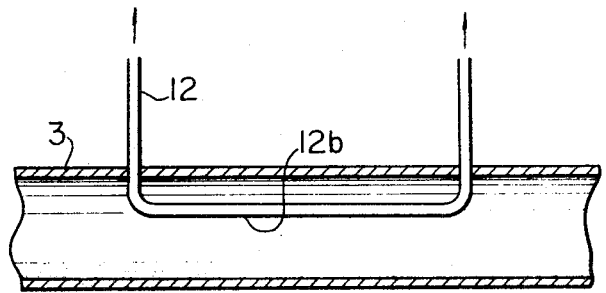

FIG. 12b illustrates an example in which the portion 12b of the passage is passed through the exhaust manifold 3 so that the air in the passage 12b is warmed direct with the heat of the exhaust gases passing through the exhaust manifold.

If preferred, the atmospheric air to be additionally fed to the engine may be passed through heated engine cooling water where the engine is of water-cooled type. If the engine is of air-cooled type, then it will be preferable to pass the heated engine cooling air through an air filter.

Figure 13A:
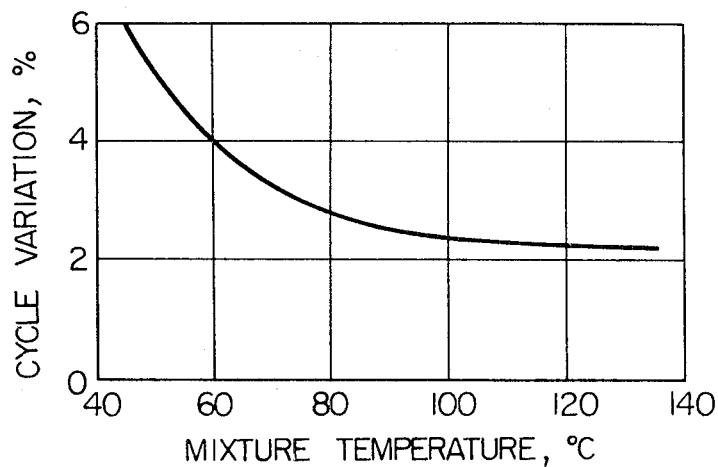
FIGS. 13a and 13b are graphical representations of cycle variation and probability of misfiring, respectively, in terms of temperature of the air to mixed with the air-fuel mixture supplied to the engine.
Figure 13B:
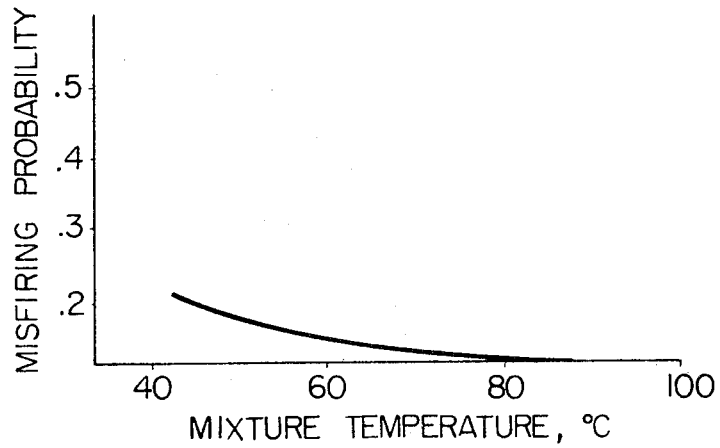

The effectiveness of supplying warmed air to the air-fuel mixture to be supplied to the engine will be clearly ascertained from the graphical representations of FIGS. 13a and 13b. As the temperature of an air-fuel mixture increases, say, beyond about 60° C., then the percentage of cycle variation and the probability of misfiring in the engine can be reduced remarkably as observed in FIGS. 13a and 13b, respectively. This will mean that the engine can be driven with stabilized combustion performance by means of increasing the temperature of the air-fuel mixture which the engine receives.

What is claimed is:

1. An air-pollution preventive system for a motor vehicle having an internal combustion engine with a carburetor, a combustion chamber and an intake manifold comprising, in combination, control means for giving an electrical output signal in response to conditions in which the motor vehicle is driven for acceleration or hill climbing, and a solenoid valve actuated by said signal having a chamber for providing air communication between the intake manifold of the engine and the atmosphere, a valve element movably mounted in said chamber, a solenoid coil, a hollow movable core integral with said valve element and slidably mounted in said chamber, a compression spring mounted within said hollow moving core for urging said movable core to a position in which said element blocks said air communication, an inlet passage vented to the atmosphere and led into said chamber, and an outlet passage leading from said chamber downstream of said valve element to the intake manifold, said valve element being unseated when said solenoid coil is energized to cause said movable core to move to its retracted position whereby said inlet passage and said outlet passage communicate with each other.

2. A system according to claim 1, wherein said conditions are represented by the combination of engine speed and vacuum in the intake manifold.

3. A system according to claim 1, wherein said conditions are represented by the combination of vehicle speed and vacuum in the intake manifold.

4. A system according to claim 1, wherein said carburetor has a throttle valve and wherein said conditions are represented by the combination of vehicle speed and angular position of said throttle valve of the carburetor.

5. A system according to claim 1, further comprising means for heating said air to a suitable temperature before it is drawn to the engine combustion chamber.

6. A system according to claim 1, wherein said control means comprises a power source, a diaphragm device, a vacuum switch connected with and controlled by said diaphragm device, a solenoid device, an engine speed switch connected with and controlled by said solenoid device, and circuit means connecting said vacuum and engine speed switches in series with said power source and said solenoid coil of said solenoid valve, said diaphragm device comprising an atmospheric chamber vented to the atmosphere, a vacuum chamber communicating with the intake manifold of the engine, a diaphragm member separating said atmospheric chamber from said vacuum chamber, a connecting rod connecting said diaphragm member and said vacuum switch and extending through said atmospheric chamber, and a compression spring mounted in said vacuum chamber to urge said diaphragm member toward a position in which said connecting rod is moved to close said vacuum switch, said spring being calibrated to overpower an intake manifold vacuum lower than a level corresponding to a predetermined engine speed and said solenoid device comprising a pulse counter connected at its input terminal with an ignition distributor of the engine for detecting the number of pulses supplied therefrom, a solenoid coil connected with the output terminal of said pulse counter and energized thereby when said number of pulses falls within a range of engine speeds, a movable core cooperating with said solenoid coil of the solenoid device and normally held in a position to keep said engine speed switch open when the associated solenoid coil remains deenergized, and a connecting rod connecting said removable core with said engine speed switch, said movable core of the solenoid device being moved to a position in which said engine speed switch is closed through the associated connecting rod when said solenoid coil of the solenoid device is energized, whereby said solenoid coil of the said solenoid valve is energized and said valve element is unseated when both of said vacuum and engine speed switches are closed concurrently.

7. A system according to claim 1, wherein said control means comprises a power source, a diaphragm device, a vacuum switch connected with and controlled by said diaphragm device, a vehicle speed detector which detects vehicle speed at the output shaft of the transmission of the vehicle and delivers a voltage proportional to the vehicle speed detected, a vehicle speed switch connected with and controlled by said vehicle speed detector, means connecting said vacuum and engine speed switches in series with said power source and said solenoid coil, said diaphragm device comprising an atmospheric chamber vented to the atmosphere, a vacuum chamber communicating with the intake manifold of the engine, a diaphragm member separating said atmospheric chamber from said vacuum chamber, a connecting rod connecting said diaphragm member and said vacuum switch, and a compression spring mounted in said vacuum chamber to urge said diaphragm member to a position in which said connecting rod is moved to close said vacuum switch, said spring being calibrated to overpower an intake manifold vacuum lower than a level corresponding to a predetermined engine speed, and said vehicle speed detector being operative to cause said vehicle speed switch to close when the detector detects a predetermined range of vehicle speeds and delivers a voltage proportional to the vehicle speed detected, whereby said solenoid coil of said solenoid valve is energized and said valve element is unseated when both of said vacuum and vehicle speed switches are closed concurrently.

8. A system according to claim 1, wherein said carburetor has a throttle valve with a rotatable shaft and wherein said control means comprises a power source, a throttle valve switch, a cam arrangement cooperating with the throttle valve of the carburetor to actuate said throttle valve switch, a vehicle speed detector, an a vehicle speed switch connected with and operated by said vehicle speed detector, said throttle valve switch and vehicle speed switch being connected in series with said power source and said solenoid coil of said solenoid valve, said cam arrangement comprising a cam element having a projecting peripheral edge portion and securely mounted on and rotatable with the rotatable shaft of the throttle valve, an actuating rod connected with said throttle valve switch and positioned relative to said cam element, and a compression spring urging said actuating rod toward said cam element to open said throttle valve switch, said projecting peripheral edge portion being shaped and dimensioned to bring said actuating rod into a position to close said throttle valve switch when said cam element is rotated with said rotatable shaft to contact and depress said actuating rod and said vehicle speed detector being operative to cause said vehicle speed switch to close when the detector detects a speed in predetermined range of vehicle speeds and delivers a voltage proportional to the vehicle speed detected, whereby said solenoid coil of said solenoid valve is energized and said valve element is unseated when both of the throttle valve and vehicle speed switches are closed concurrently.

9. A system according to claim 1, wherein said inlet passage passes through the exhaust manifold of the engine whereby the air introduced into the passage is heated by the exhaust gases passed through the exhaust manifold.

10. A system according to claim 1, wherein said engine has an exhaust manifold and wherein a portion of said inlet passage is in thermally conducting relation with the exhaust manifold of the engine whereby the air introduced into the passage is heated by the enthalpy of the exhaust gases passing through the exhaust manifold.

11. A system according to claim 10, wherein said control means further comprises a thermal switch which is responsive to the temperature of the engine and which is kept open when the engine is cold, said thermal switch being closed when said temperature reaches a predetermined level at which the engine is warmed up.

* * * * *